United States Patent [19]
Hudgin et al.

[11] 3,821,136
[45] June 28, 1974

[54] WATER ABSORBTIVE POLYURETHANE POLYMERS

[75] Inventors: Donald Edward Hudgin, Princeton Junction; Edgar Allan Blair, Princeton, both of N.J.

[73] Assignee: Princeton Polymer Laboratories, Inc., Plainsboro, N.J.

[22] Filed: June 23, 1972

[21] Appl. No.: 265,541

[52] U.S. Cl. ........ 260/9, 260/2.5 AD, 260/2.5 AM, 260/13, 260/77.5 AP, 260/77.5 AS, 260/77.5 AT, 260/77.5 AM, 260/75 TN
[51] Int. Cl............................................ C08g 22/06
[58] Field of Search........... 260/77.5 AQ:77.5 AS, 260/77.5 AT, 77.5 AM, 2.5 AD, 2.5 AM, 13, 9; 351/160, 175; 264/1

[56] References Cited
UNITED STATES PATENTS

| | | |
|---|---|---|
| 2,266,777 | 12/1941 | Lieser ................................ 260/212 |
| 3,042,666 | 7/1962 | Gentles .............................. 260/209 |
| 3,085,085 | 4/1963 | Wismer et al. ..................... 260/209 |
| 3,153,002 | 10/1964 | Wismer et al. ..................... 260/2.5 |
| 3,492,255 | 1/1970 | Cobbledick .......................... 260/18 |
| 3,567,661 | 3/1971 | Patton et al. ....................... 260/2.5 |
| 3,573,234 | 3/1971 | Archipoff et al. .................. 260/2.5 |
| 3,640,997 | 2/1972 | Fijal ............................... 260/209 R |
| 3,689,442 | 9/1972 | Taub .................................... 260/9 |

*Primary Examiner*—William H. Short
*Assistant Examiner*—Edward Woodberry
*Attorney, Agent, or Firm*—Curtis, Morris & Safford

[57] ABSTRACT

Water absorbtive polyurethane polymers of resins of low equivalent weight and high molecular weight and slightly in excess of equimolar ratios of polyisocyanates or urethane linkage precursors, useful in applications where hydrophilicity or water absorbtion is needed such as for anti-fog coatings; membranes (dialysis or osmosis); swellable fabrics; castable, water-absorbent shapes; castable, machinable and polishable shapes having use as body implants and having water absorbtive properties; etc.

11 Claims, No Drawings

WATER ABSORBTIVE POLYURETHANE POLYMERS

This invention pertains to polyurethane polymers; more particularly, this invention pertains to polymers which absorb water, i.e., polymers which are rigid, machinable and polishable polyurethane polymers and/or are suitable for coatings, membranes, swellable fabrics; moreover, this invention pertains to articles of manufacture made therefrom.

BACKGROUND OF INVENTION

Within the last few decades, the art pertaining to polyurethane chemistry has seen a tremendous growth. As a result, polyurethane polymers of various kinds and forms are fairly well known. In general terms the polyurethanes comprise polymers formed from a resin which has an active hydrogen atoms and a polyisocyanate, such as a diisocyanate. Numerous resin systems now exist which have been combined in various ratios with the polyisocyanates, and the end polymers have ranged from rigid castable shapes to soft foams. Various polymer and prepolymer reactions for preparing the above types of polyurethanes have also been developed, and these reactions are fairly well explored.

Of the many resin systems which are known and the properties of which have been described, there are continuously being added new resin systems which in combination with the polyisocyanate overcome some vexing problems encountered with other resin systems or provide better properties for a particular end use. However, many of these resin systems a priori do not predictably function in a given polymer system; and hence, the empirical observations still are at the foundation for the development of new resin systems as well as discovery of new polymers.

In addition, the various isocyanates which have been available (or proposed to be useful without being available) give different properties in any given resin system as well as give different properties from resin system to resin system. Hence, the predictability of end polymer properties cannot be inferred from a behavior of the resin system nor the behavior of this resin system in combination of isocyanate, except in very general terms. For this reason the proper combination of the particular resin system with the proper isocyanate and the proper interaction or intercombination with each other is still an empirical art with unpredictable end results.

PRIOR ART

Numerous publications exist in the polyurethane polymer art such as J. H. Saunders et al., *Polyurethanes, Chemistry and Technology*, Part I Chemistry, Interscience Publishers (1962). This book summarizes in part the existing prior art. A great number of subsequent publications including patent literature have also appeared both in the United States and abroad. These publications are too numerous to mention; but in some respect or another, these have some additional illustrations of various polyurethane resins, the isocyanates, the method of employing or making the same. As it is well appreciated by those skilled in the art, these patents are too numerous to list. Inasmuch as there is disclosed in these patents in some way or another something in common because of the common nature of the polyurethane polymer, these patents are illustrative of polyurethane polymers as such.

In respect to the present invention, the prior art which pertains to the same is most closely related to producing castable shapes which are strong and desirably nonvariant in properties. However, the prior art, as a desideratum, has striven to form strongly hydrophobic systems for the reason that the strongly hydrophobic polymers display low, if any, dimensional variation in the polymer. If hydrophilicity or water absorbtion has been sought for polyurethane polymers, it has most generally been sought for polymers from which foams are formed which are useful as sponges. In general, the hydrophilic polymers have been rather soft.

Of the more prevalent resin systems for producing soft hydrophilic polyurethanes, the polyethylene glycol and polyalkylene amine resin systems are known; the last two resin systems, in distinction from the polypropylene glycol resin systems which are generally hydrophobic, are used for this purpose. Further, the combination of the polyethylene glycol and polypropylene glycol resins have been used to achieve sufficient softness and at the same time sufficient hydrophobicity so that the end product would have the desirable properties. Nevertheless, in soft polymers water pickup has often been considered an undesirable property.

In reference to the isocyanates which have been employed in combination with the above described resins, conventional aromatic isocyanates, when reacted with the various resins, display properties which are unacceptable for a number of reasons.

Although the unacceptable properties can be tolerated in a number of products, in other products the use of aromatic diisocyanates have been found to be acceptable because of the price, availability and well known properties despite the instability and/or degradation of the aromatic diisocyanate in the polyurethane end polymer.

THE INVENTION

A polyurethane polymer has now been discovered and invented which has the desired properties of softness and water pickup and in the dry state physical properties such as machinability and polishability. This polyurethane polymer is derived from a unique combination of a proper resin and a proper isocyanate. Besides numerous other beneficial properties and uses, this polymer is suitable for making soft contact lenses. The use of the novel polyurethane polymer for making soft lenses and the soft lenses made from the novel polymer are urged in a companion application Ser. No. 265,543 filed June 23, 1973 and now allowed.

In respect to the novel polyurethane, it is obtained by employing a proper -OH group terminated resin. This resin is a product of a propoxylated, ethoxylated, dioxolane reacted or amine or polyamine reacted polyhydroxy compound having a proper molecular weight and proper equivalent weight in combination with the necessary ratio of carbon to oxygen or nitrogen atoms. This resin, when reacted with the isocyanate in a proper amount, produces a rigid, substantially nondegradable polyurethane polymer (in its intended environment) such that the end polymer is especially useful for producing articles of manufacture such as soft lenses by the present day technology. These novel properties have been discovered despite the existence of various prior art resins which have been stated to be suitable but have failed for one reason or another.

Moreover, while it is known that prior art polyurethanes which are derived from a so-called "soft" resin can be hardened by using increased amounts of isocyanate, with the concomitant decrease in hydrophilicity, the present invention has been achieved by using a proper and low ratio of isocyanate to resin ratio. The observed phenomenon of the increase in hardness concomitant hydrophobicity of the polymer by increase of isocyanate to resin ratio has been counteracted in the present invention, in distinction from the prior art, by the proper and novel combination of the molecular weight, equivalent weight, and chemical structure of the resin and isocyanate with the novel end result being a polymer having great increase in water pickup, machinability and polishability. As a consequence, the presently discovered polyurethanes have answered the desired need for a polymer which has the parameters acceptable for manufacturing articles of commerce such as soft lenses under the conditions of the present day technology requiring machinable and polishable lenses.

For purposes of the present invention, the resin system is a tractable, i.e., a workable, resin system for a reaction with the isocyanates. A workable resin system is one which is formed of the resin and a solvent or a resin which is a liquid or can be liquified at a reasonable working temperature, e.g., up to 100° C. The preferred solvent is one of the following: dimethylformamide, dioxane, butyrolactone.

Of the above-mentioned resins, the propoxylated, ethoxylated or mixed propoxylated and ethoxylated resins are preferred. Further, the dioxolane reacted resin is also very desirable, but its availability mitigates against its use. Although amine and polyamine reacted resins satisfy the requirements for the end polymer, the "in polymer use" properties of these resin systems makes these inferior to the above-mentioned resin components.

Amplifying the above, the resin system is derived from a compound which has six or in excess of six —OH groups and which compound is then reacted with the appropriate precursor to obtain, e.g., a propoxylated or ethoxylated or amine group containing resin or a resin having a mixture of these groups such that the ratio of carbon to oxygen or amine atoms is less than 3 to 1, i.e., 2.8 to 1 or preferably 2.5 to 1 and lower. As each of the —OH groups in the compound can react to give the propoxylated, etc., moiety (which has an -OH or amine terminal group in turn), the end product will have the equivalent number of —OH (or amine) end groups for reacting with the isocyanate moiety to form the final polymer.

It is preferable to have a resin precursor compound which has eight or more —OH groups. Of the useful resins those derived from sucrose and raffinose are acceptable. Octahydroxy or more than eight —OH group carrying compounds besides the above are the following: maltose, lactose, cellobiose. These compounds may also be derived by reacting a combination of —OH groups, aldehyde and —COOH group carrying carbohydrates as long as all the reactive groups are reacted with the isocyanate. Additionally, polyvinylalcohol of about 50 monomer units may be employed.

Further, the equivalent weight of the resin must be 170 or less but preferably 140 or less. Simultaneously, the molecular weight should be greater than 500, more desirably greater than 840, preferably 1,030 or greater up to 2,000 or more. Finally, as mentioned above, the ratio of carbon atoms to oxygen or nitrogen atoms (in the amine or polyamine) in the resin system must be less than 3:1 to 1.5:1, even as low as 1.2:1, i.e., from a value which approximates a propoxylated octahydroxy compound wherein the propoxylated groups consist of repeating units derived from propylene oxide to the same compound which has been reacted with the same number of dioxolane units including the carbon to oxygen ratio content of the basic hydroxy group carrying compound and for the low ratio the partially adducted compounds, i.e., ethoxylated etc., compounds. Moreover, the above molecular and equivalent weight criteria must also be satisfied.

Representative resin systems are as follows: propoxylated sorbitol; ethoxylated sorbitol; propoxylated manitol; ethoxylated manitol; dioxolane reacted sorbitol or manitol; mixed propoxylated-ethoxylated sorbitol or manitol; propoxylated sucrose, raffinose, maltose, lactose or cellobiose; ethoxylated sucrose, raffinose, maltose, lactose, or cellobiose; mixed propoxylated-ethoxylated sucrose, raffinose, maltose, lactose or cellobiose; ethylene imine reaction product of sorbitol, manitol, sucrose, raffinose, maltose, lactose or celloboise; propylene imine reaction product of sorbitol, manitol, sucrose, raffinose, maltose, lactose, or cellobiose; mixed ethylene imine-propylene imine reaction products of the above polyhydroxy compounds and the dioxolane reaction products of sucrose, raffinose, maltose, lactose, or cellobiose; mixed ethylene imine, propylene imine, ethylene oxide and propylene oxide reaction products of the above polyhydroxy compounds are within the contemplation of the present disclosure.

For convenience in representation but not in respect to behavior, the resin may be depicted by a general formula as follows:

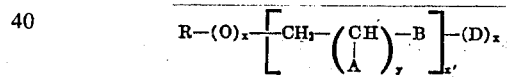

wherein R is a precursor derived from a polyhydroxy compound having 6 or more —OH groups ($x$ is 6 or greater, e.g., up to 50, derived from polyvinyl alcohol of up to 50 monomer units in a chain, including precursors for compounds such as carboxy methyl or ethyl cellulose); $y$ is 1; A is —H or —$CH_3$; B is —$CH_2$—O group, —O or —NH; D is H, and $x'$ is equal to $x$ or smaller because when these compounds are mixtures, $x'$ may be less than $x$ /and also different from $x$ by fractions of whole numbers, i.e., these compounds may be internal mixtures in a single molecule as well as mixtures of species; $x'$ may be 0 when a prepolymer formulation is used and may be as low as 1. For polyvinyl alcohol, $x'$ may also be 0.

In addition, these compounds have an equivalent weight of 170 or less, preferably 140 or less, and a molecular weight of 500 or more, desirably 840 or more, preferably 1,030 or more up to 2,000. Still further, as mentioned before, the carbon to oxygen or nitrogen ratio must be satisfied.

Most of these resins are specified by their —OH or amine number which is a function of the equivalent weight.

In respect to the isocyanates, these may be represented by OCN—R'—NCO wherein R' is aliphatic including alicyclic compounds such as aliphatic, aliphatic-alicyclic, and aliphatic-aromatic hydrocarbon compounds from 4 to 36 carbon atoms, but more conventionally from 6 to 20 and generally from 6 to 13 carbon atoms. Representative examples of the above isocyanates are: tetramethylene diisocyanate; hexamethylene diisocyanate; trimethyl-hexamethylene diisocyanate; dimer acid diisocyanate; isophorone diisocyanate; hydrogenated diphenyl methane diisocyanate; methylene di(cyclohexyl isocyanate); metaxylylene diisocyanate; diethylbenzene diisocyanate.

Other compounds which are useful are the isocyanate equivalents which produce the urethane linkages such as the nitrile carbonates, i.e., the adiponitrile carbonate of the formula

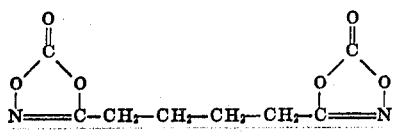

The compound is designated as ADNC and has been found as useful as the preferred isocyanates.

The preferred diisocyanate is the methylene di(cyclohexyl isocyanate) and ADNC. Other but slightly less preferred diisocyanates are trimethyl hexamethylene diisocyanate and isophorone diisocyanate.

Although the aromatic isocyanates such as TDI, MDI, NDI, DADI and TODI, etc. are useful for obtaining the polyurethane polymers and these polymers have the desirable properties, the aromatic isocyanate based polymers are only useful if the degradation or if the stabilizers can be tolerated. Hence, the aromatic isocyanates are vastly less desirable.

A mole to mole ratio of resin and NCO will produce a water soluble and fusible polymer; hence, the ratio of —NCO to resin molecules should be in about a 10 percent, even up to 15 percent, excess above the equimolar ratio. If the isocyanate is used in greater excess for the same resin, water pickup of the polymer will decrease. However, some resins (low equivalent weight) will tolerate considerable increase of the isocyanate above the equimolar ratio. Additionally, a prepolymer may be reacted with the resin in addition to the isocyanate such as a polyethylene oxide and isocyanate prepolymer. The ethylene oxide may be up to 100 units in the prepolymer; a prepolymer of 4 ethylene oxide units is a convenient lower range for the prepolymer, although the lowest unit may be ethylene glycol as a derivative of ethylene oxide. The polyol may be as low as 10 percent by weight when a prepolymer is used and as high as 40 percent by weight based on the total weight of polyol and prepolymer.

In reacting the resin with the isocyanate, either a one-shot or a prepolymer reaction procedure may be followed. The reaction is carried out by heating the reactants for the appropriate length of time; the reaction may also be accelerated or controlled by appropriate catalysts such as stannous octoate, dibutyl tin salts, DABCO, or other tertiary amines or compounds recognized as catalysts for urethane reactions and well known in the art. The polymer may be prepared in bulk, in solution or in suspension.

In furnishing an illustrative embodiment of the present invention, the following examples not only illustrate but also amplify the above described invention; however, the examples herein are for the purpose of illustrating the invention which invention is to be viewed from all the present disclosure and not merely from the examples.

EXAMPLE I

A prepolymer was prepared by reacting 10 g of a polyethylene oxide with a molecular weight of 400 with 13.1 g Hylene W, using 0.01 g stannous octoate as the catalyst. This prepolymer was reacted with 4 g Atlac 2566, giving a tough polymer which swelled in water, could be machined cleanly, but could not be polished. Atlac 2566 is reportedly a propoxylated sorbitol with a hydroxyl number of 650.

EXAMPLE II 10.3 g of Voranol RS-45 D, from Dow Chemical, a propoxylated sucrose having a molecular weight of 1030 was reacted with 2.3 g of Hylene W, by heating for 72 hours at 95° C. The polymer melted when cut with a saw, and could not be polished. It swelled and softened in water and absorbed about 30 percent $H_2O$. Hylene W is an aliphatic isocyanate with an equivalent weight of 131 and is reportedly hydrogenated HMDI. Atlac 2566 as well as Voranol RS-45 D has been used for rigid foams when reacted in an equivalent to equivalent ratio with isocyanates producing a highly cross-linked, highly hydrophobic polymer.

EXAMPLE III 10.3 g of Voranol RS-45 D was reacted with 3.0 g Hylene W as in Example II. The product was hard and did not melt when cut with a saw. It could be machined and polished. It swelled in water and softened, and absorbed 26 percent water. A contact lens was made with this polymer, and it had the desirable properties of a soft contact lens.

EXAMPLE IV 10.3 g Voranol RS-45 D was reacted with 2.3 g IPDI (isophorone diisocyanate), a diisocyanate with an equivalent weight of 111 derived from isophorone obtained from Veba Chemie, giving a hard polymer which tended to melt when cut with a saw. It swelled and softened in water, absorbing about 50 percent $H_2O$. Increasing the amount of isocyanate will harden the polymer but also reduce the water pickup, i.e., adding a trifunctional isocyanate compound will make the resin more thermoset; similarly, adding more isocyanate, the same characteristic is obtained; an acceptable polymer of 37 percent water pickup can thus be obtained.

EXAMPLE V 10.3 g Voranol RS-45 D was reacted with 1.5 g ADNC (adiponitrile carbonate) from Arco Chemical having an equivalent weight of 130 by heating at 95° C until evolution of $CO_2$ ceased. Then 1.5 g Hylene W was added and the mixture heated to complete the reaction. The resulting product was softer in the dry state than the product from Example III but absorbed the same amount of water.

The polymers of this invention are useful for purposes such as: membranes (dialysis or osmosis), absorbents, controlled release agents, swellable fabrics, gauzes, wet friction elastomers, artificial leather, gas filters, dentures, oil resistant shapes, body implants, etc. As coatings, the present polymers suggest themselves for the following uses: as washable surface coatings; release paints controlled and leaching; anti-fog coatings, e.g., in diving goggles; antistatic agents; friction reducing agents used for irrigation or firefighting, etc.

What is claimed is:

1. A polyurethane polymer comprising:
   A. as a resin precursor of said polyurethane polymer, at least one polyfunctional resin having an equivalent weight of 170 and less, a molecular weight of at least 500 wherein the polyfunctional resin is the reaction product of at least one member selected from the group consisting of propylene oxide ethylene oxide, dioxolane, ethylene imine or propylene imine with a hydroxy group containing compound, said resin precursor having the general formula

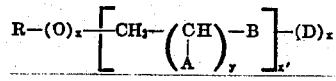

wherein R is a precursor derived from a polyhydroxy compound having 6 or more —OH groups; X is 6 or higher; $y$ is 1; A is —H or —CH$_3$; B is —CH$_2$—O group or —O or —NH; D is H, and $x'$ is equal to $x$ or less than $x$; when mixtures, $x'$ may be less than $x$ and different from $x$ by whole numbers or fractions of whole numbers said resin having a carbon to oxygen or amine ratio of 2.8:1 to 1.2 to 1;
   B. as a urethane linkage precursor of said polyurethane polymer at least one aliphatic, alicyclicaliphatic, mixed aliphatic-aromatic, or an aromatic polyfunctional isocyanate, a nitrile carbonate, or mixtures of same of a functionality of 2 and higher in an amount from 0.02 percent to about 15 percent excess above the equimolar ratio in reference to the equimolar amount of said resin.

2. A polyurethane polymer comprising:
   A. as a resin precursor of said polyurethane polymer at least one polyfunctional resin having an equivalent weight of 170 and less, a molecular weight of at least 500 wherein the polyfunctional resin is the reaction product of at least one member selected from the group consisting of propylene oxide, ethylene oxide, dioxolane, ethylene imine or propylene imine with a hydroxy group containing compound, said resin precursor having the general formula

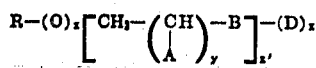

wherein R is a precursor derived from a polyhydroxy compound having 6 or more —OH groups; $x$ is 6 to 50; $y$ is 1; A is —H or —CH$_3$; B is —CH$_2$—O group or —O or —NH; D is H, and $x'$ is equal to $x$ or less than $x$; when mixtures, $x'$ may be less than $x$ and different from $x$ by whole numbers or fractions of whole numbers said resin having a carbon to oxygen or nitrogen ratio of 2.8:1 to 1.2:1;
   B. as a urethane linkage precursor of said polyurethane polymer at least one aliphatic, alicyclicaliphatic, mixed aliphatic-aromatic, or an aromatic polyfunctional isocyanate, a nitrile carbonate, or mixtures of same of a functionality of 2 and higher in an amount from 0.02 percent to about 15 percent excess above the equimolar ratio in reference to the equimolar amount of said resin;
   C. as additional urethane linkage precursor of said polymer a prepolymer of polyethylene oxide and said isocyanate.

3. A polyurethane polymer comprising:
   A. as a resin precursor of said polymer at least one polyfunctional resin having an equivalent weight of 140 and less, a molecular weight of at least 340 and a carbon to oxygen or amine ratio of 2.4:1 to 1.2:1 and wherein the polyfunctional resin is the reaction product of at least one member selected from the group consisting of propylene oxide, ethylene oxide, dioxolane, ethylene imine or propylene imine with a hydroxy group containing compound having 6 and more —OH groups per molecule, and
   B. as a urethane linkage precursor of said polymer at least one aliphatic, aliphatic-alicyclic, mixed aliphatic-aromatic, or an aromatic polyfunctional isocyanate in an amount from 0.02% to about 15% excess above the equimolar ratio in reference to the equimolar amount of said resin.

4. A polyurethane polymer comprising:
   A. as a resin precursor of said polymer at least one polyfunctional resin having a equivalent weight of 140 and less, a molecular weight of at least 840 and a carbon to oxygen or amine ratio of 2.8:1 to 1.2:1 and wherein the polyfunctional resin is the reaction product of at least one member selected from the group consisting of propylene oxide, ethylene oxide, dioxolane, ethylene imine or propylene imine with a hydroxy group containing compound having 6 and more -OH groups per molecule;
   B. as a urethane linkage precursor of said polymer at least one aliphatic, aliphatic-alicyclic, mixed aliphatic-aromatic, or an aromatic polyfunctional isocyanate in an amount from 0.02% to about 15% excess above the equimolar ratio in reference to the equimolar amount of said resin;
   C. as additional urethane linkage precursor of said polymer a prepolymer of polyethylene oxide and said isocyanate.

5. The polyurethane polymer as defined in claim 1 and wherein the equivalent weight of the resin is 140 and less and the molecular weight is 1,030 and more, and wherein the urethane linkage precursor is selected from the group consisting of trimethyl hexamethylene diisocyanate, methylene di(cyclohexyl isocyanate), and adiponitrile carbonate.

6. The polyurethane polymer as defined in claim 1 and wherein the resin is a propoxylated, ethoxylated or mixtures of same of sorbitol, manitol, sucrose, maltose, lactose, cellobiose, or raffinose.

7. The polymer as defined in claim 1 and wherein the hydroxy compound precursor of said resin, defined by R—(OH)$_x$, is sorbitol, manitol, sucrose, maltose, lactose, cellobiose, polyvinyl alcohol of up to 50 repeating units and methoxy cellulose.

8. The polymer as defined in claim 1 and wherein the isocyanate is selected from the group consisting of tetramethylene diisocyanate; hexamethylene diisocyanate; trimethylhexamethylene diisocyanate; dimer acid diisocyanate; isophorone diisocyanate; hydrogenated diphenyl methane diisocyanate; methylene di(cyclohexyl isocyanate); metaxylylene diisocyanate; diethyl benzene diisocyanate; decamethylene 1,10- diisocyanate; cyclohexylene 1,2-diisocyanate and cyclohexylene 1,4-diisocyanate.

9. The polymer as defined in claim 1 and wherein the isocyanate is selected from the group consisting of 2,4-and 2,6-tolylene diisocyanate; 4,4'-diphenyl methane diisocyanate; dianisidine diisocyanate; tolidine diisocyanate; xenylene diisocyanate; 1,5-naphthalene diisocyanate; and tetrahydro naphthalene-1,5-diisocyanate.

10. The polymer as defined in claim 1 and wherein the urethane linkage precursor is adiponitrile carbonate.

11. The polymer as defined in claim 1 and wherein the hydroxy compound is a propoxylated sucrose of 140 equivalent weight and 1,030 molecular weight.

* * * * *